(12) United States Patent
Gao et al.

(10) Patent No.: US 11,191,408 B2
(45) Date of Patent: Dec. 7, 2021

(54) DOCKING STATION FOR CLEANING ROBOTS WITH ROLLER BRUSH

(71) Applicant: MIDEA ROBOZONE TECHNOLOGY CO., LTD., Suzhou (CN)

(72) Inventors: Jisong Gao, Suzhou (CN); Xiaowei Xu, Suzhou (CN); Yuan Chen, Suzhou (CN); Xianmin Chen, Suzhou (CN)

( * ) Notice: Subject to any disclaimer, the term of this patent is extended or adjusted under 35 U.S.C. 154(b) by 265 days.

(21) Appl. No.: 16/703,813

(22) Filed: Dec. 4, 2019

(65) Prior Publication Data
US 2020/0187740 A1    Jun. 18, 2020

(30) Foreign Application Priority Data

Dec. 13, 2018   (CN) .......................... 201811527252.4

(51) Int. Cl.
*A47L 9/28*    (2006.01)
*A47L 9/10*    (2006.01)
(Continued)

(52) U.S. Cl.
CPC ............. *A47L 9/2873* (2013.01); *A47L 9/102* (2013.01); *B08B 5/04* (2013.01); *B08B 7/04* (2013.01); *A47L 2201/028* (2013.01)

(58) Field of Classification Search
CPC . A46B 13/001; A46B 17/06; A47L 2201/028; A47L 9/00; A47L 9/0477;
(Continued)

(56) References Cited

U.S. PATENT DOCUMENTS 1,542,025 A * 6/1925 Ballman ................. A46B 17/06
                                                          15/38
2,523,823 A * 9/1950 Grzelczyk ............. A47L 9/0477
                                                         15/141.2
(Continued)

FOREIGN PATENT DOCUMENTS

CN    102342805 A    2/2012
CN    104248397 A    12/2014
(Continued)

OTHER PUBLICATIONS

Second OA of Chinese Application No. 201811527252.4.
Search Report of Chinese Application No. 201811527252.4.
EP—Supplementary Search Report (EESR).

*Primary Examiner* — Marc Carlson
(74) *Attorney, Agent, or Firm* — Kilpatrick Townsend & Stockton, LLP

(57) ABSTRACT

The present application provides a docking station including a cleaning system disposed in a base thereof. The cleaning system includes a cutting chamber, an upper end cover, and a lower end cover; and the cutting chamber is configured to receive a to-be-cleaned object, and the upper end cover is detachably connected to an upper end of the cutting chamber; the lower end cover is disposed at a lower end of the cutting chamber and rotatably connected with the cutting chamber; the to-be-cleaned object is detachably fixed to the lower end cover; and a blade assembly configured to clean the to-be-cleaned object is provided at an inner wall of the cutting chamber. The docking station may clean the to-be-cleaned object, such as a roller brush of a robot cleaner, while charging the robot cleaner, which provides an auxiliary function, extends the applicability and is more convenient for home use.

10 Claims, 3 Drawing Sheets

(51) Int. Cl.
   *B08B 5/04*   (2006.01)
   *B08B 7/04*   (2006.01)

(58) Field of Classification Search
   CPC ......... A47L 9/102; A47L 9/2873; B08B 5/04; B08B 7/04
   See application file for complete search history.

(56) References Cited

U.S. PATENT DOCUMENTS

| | | | | |
|---|---|---|---|---|
| 4,403,364 | A * | 9/1983 | Schroeder | A46B 17/06 |
| | | | | 15/38 |
| 6,041,470 | A | 3/2000 | Branham et al. | |
| 6,171,559 | B1 * | 1/2001 | Sanders | A46B 17/06 |
| | | | | 134/144 |
| 10,136,786 | B2 * | 11/2018 | Deng | H02J 7/0027 |
| 10,278,488 | B1 * | 5/2019 | Greeson | A46B 9/023 |
| 2002/0179079 | A1 * | 12/2002 | Sekiya | B28D 5/0082 |
| | | | | 125/13.01 |
| 2004/0083868 | A1 * | 5/2004 | Ohmiya | B23Q 17/24 |
| | | | | 83/168 |
| 2006/0107971 | A1 * | 5/2006 | Chasen | B08B 3/02 |
| | | | | 134/10 |
| 2012/0177790 | A1 * | 7/2012 | Tuchrelo | B26D 3/282 |
| | | | | 426/231 |
| 2013/0192021 | A1 * | 8/2013 | Eriksson | A47L 9/2889 |
| | | | | 15/383 |
| 2014/0304941 | A1 * | 10/2014 | Eriksson | A47L 9/30 |
| | | | | 15/383 |
| 2014/0366300 | A1 * | 12/2014 | Eriksson | A47L 9/0477 |
| | | | | 15/246.2 |
| 2016/0228925 | A1 * | 8/2016 | Frantsevich | A46B 17/06 |
| 2017/0087926 | A1 * | 3/2017 | Campbell | A46B 17/06 |
| 2018/0296051 | A1 * | 10/2018 | Jung | A47L 9/30 |
| 2018/0338654 | A1 * | 11/2018 | Kelsey | A47L 9/0477 |
| 2019/0193120 | A1 * | 6/2019 | Brown | A47L 9/0613 |
| 2019/0295850 | A1 * | 9/2019 | Arakida | B28D 5/02 |
| 2019/0314863 | A1 * | 10/2019 | VandenBergh | A46B 17/06 |
| 2020/0391410 | A1 * | 12/2020 | Fukuoka | B28D 5/0094 |
| 2021/0000249 | A1 * | 1/2021 | Chapman | B08B 15/02 |
| 2021/0187566 | A1 * | 6/2021 | Della Torre | A46B 9/06 |

FOREIGN PATENT DOCUMENTS

| | | | | | |
|---|---|---|---|---|---|
| CN | 105496316 | A | * | 4/2016 | |
| CN | 105496316 | A | | 4/2016 | |
| CN | 105595920 | A | * | 5/2016 | |
| CN | 206214028 | U | | 6/2017 | |
| CN | 107772777 | A | * | 3/2018 | |
| CN | 107772777 | A | | 3/2018 | |
| EP | 2407077 | A2 | | 1/2012 | |
| EP | 3546080 | A1 | * | 10/2019 | B08B 3/08 |
| GB | 2261812 | A | | 6/1993 | |

\* cited by examiner

DOCKING STATION FOR CLEANING ROBOTS WITH ROLLER BRUSH

CROSS-REFERENCES TO RELATED APPLICATIONS

The present application is based on and claims priority to Chinese patent application number 201811527252.4, filed on Dec. 13, 2018, the entire disclosure of which is hereby incorporated by reference.

FIELD

The present disclosure relates to the field of household appliances, in particular to a docking station.

BACKGROUND

With the rapid development of science and technology, a robot cleaner is more and more popular in the field of household appliances. The robot cleaner, also known as automatic sweeper, smart vacuum cleaner, robot vacuum cleaner, etc., is a type of smart household appliances. By artificial intelligence, the robot cleaner may automatically clean floors.

At present, the robot cleaner needs to be charged at a docking station after cleaning. However, the users desire a docking station not only to supply energy but also to provide other auxiliary functions for home use.

SUMMARY

A docking station is provided according to embodiments of the present disclosure, to solve or alleviate one or more problems in the existing technology, or at least provide a beneficial choice.

A docking station is provided according to an embodiment of the present disclosure. The docking station includes a cleaning system disposed in a base of the docking station; and the cleaning system includes a cutting chamber, an upper end cover and a lower end cover;

the cutting chamber is configured to receive a to-be-cleaned object, and the upper end cover is detachably connected to an upper end of the cutting chamber;

the lower end cover is disposed at a lower end of the cutting chamber and is rotatably connected with the cutting chamber;

the to-be-cleaned object is detachably fixed to the lower end cover; and a blade assembly configured to clean the to-be-cleaned object is provided at an inner wall of the cutting chamber.

In an embodiment, the cutting chamber is detachably connected to the base.

In an embodiment, and the cleaning system further includes an air pressure chamber and a collecting chamber;

the cutting chamber is disposed within the air pressure chamber, and an air passage is formed between the cutting chamber and the air pressure chamber;

a plurality of through holes are provided on the cutting chamber, and the plurality of through holes communicates an interior of the cutting chamber with the air passage;

the air passage communicates the air pressure chamber with the collecting chamber.

In an embodiment, the air pressure chamber and the cutting chamber are fixed on the base, and the collecting chamber is detachably connected to the base.

In an embodiment, a filtering member is provided in the collecting chamber, and the filtering member is adjacent to the air pressure chamber.

In an embodiment, the cleaning system further includes a drive mechanism connected to the lower end cover and configured to drive the lower end cover to rotate relative with the cutting chamber.

In an embodiment, a control system connected to the drive mechanism is provided on the docking station and configured to activate or deactivate the drive mechanism.

In an embodiment, and a timing unit is provided in the control system; and the timing unit is configured to start timing when the control system activates the drive mechanism; and the timing unit is configured to send a first signal to the control system in response to the timing unit counting up to a preset time.

In an embodiment, the control system receives the first signal to deactivate the drive mechanism.

In an embodiment, the cleaning system further includes a drive mechanism connected to the cutting chamber and configured to drive the cutting chamber to rotate relative with the lower end cover.

The docking station of the present disclosure may clean the to-be-cleaned object, such as a roller brush of a robot cleaner, while charging the robot cleaner, which provides an auxiliary function, extends the applicability and is more convenient for home use.

The above summary is for the purpose of illustration only and is not intended to be limiting. In addition to the illustrative aspects, embodiments and features described above, further aspects, embodiments and features of the present disclosure will be readily apparent from the description and appended claims.

BRIEF DESCRIPTION OF THE DRAWINGS

In the drawings, the same reference numerals denote the same or similar parts or elements throughout all the drawings unless otherwise specified. The drawings are not necessarily drawn to scale. It should be understood that these drawings depict only some embodiments disclosed in accordance with present disclosure and should not be construed as limiting the scope of present disclosure.

DETAILED DESCRIPTION OF THE DISCLOSURE

A docking station is provided according to an embodiment of the present disclosure.

The docking station of the present disclosure will now be described with reference to FIGS. 1 to 3.

Figure 1:
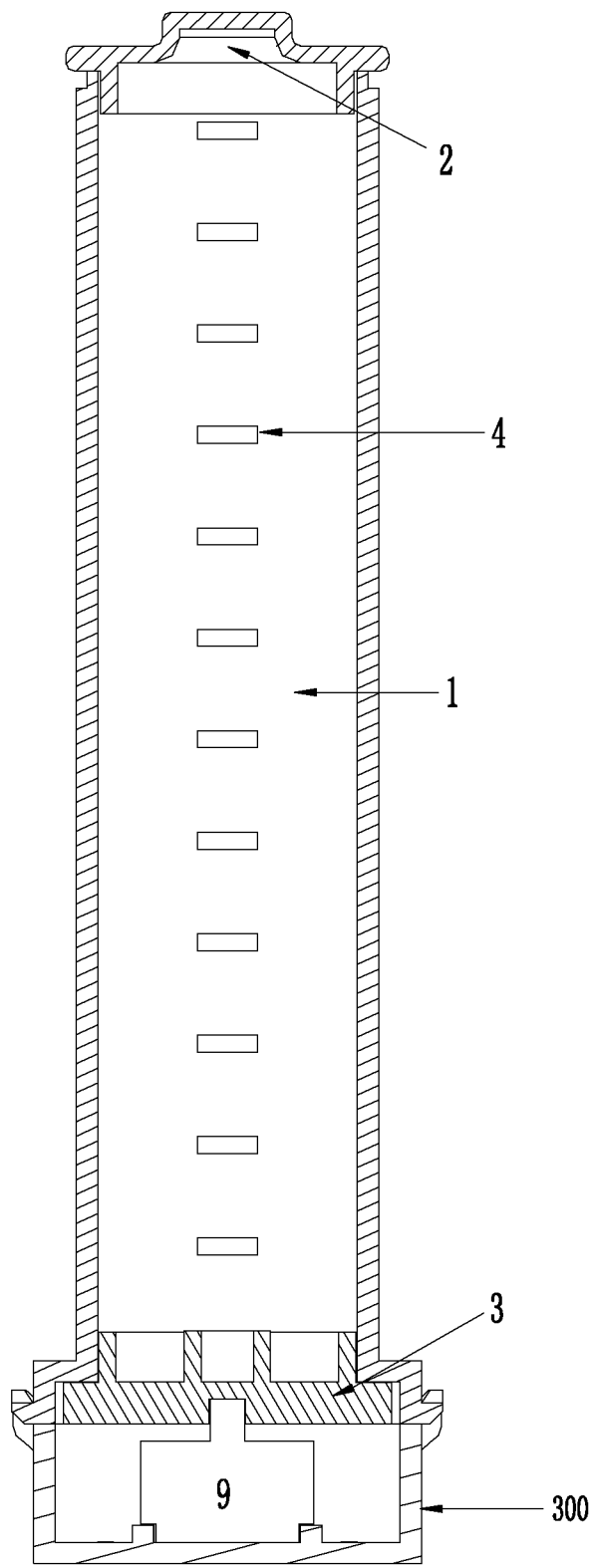
FIG. 1 is a schematic cross-sectional view of a cleaning system 100 according to an embodiment of the present disclosure.

Referring to FIG. 1, in an embodiment, the docking station of the present disclosure may include a cleaning system 100. The cleaning system 100 may be disposed in a base 300 of the docking station.

The cleaning system 100 includes a cutting chamber 1, an upper end cover 2, and a lower end cover 3. In addition, the cutting chamber 1 may be used for receiving a to-be-cleaned object, for example, a roller brush of a robot cleaner or the like. Hereinafter, the roller brush of the robot cleaner is described as to-be-cleaned object.

Additionally, the upper end cover 2 is detachably connected to an upper end of the cutting chamber 1, whereby the upper end cover 2 may open or close the cutting chamber 1 to put in or take out the roller brush. The lower end cover 3 may be disposed at a lower end of the cutting chamber 1, and the lower end cover 3 may be rotatably connected with cutting chamber 1.

Meanwhile, the roller brush is also detachably fixed to the lower end cover 3. When the roller brush is received inside the cutting chamber 1, the roller brush may be fixed to the lower end cover 3. Then, when the lower end cover 3 rotates relative to the cutting chamber 1, the roller brush may also rotate relative to the cutting chamber 1. However, when the roller brush is need to be taken out from the cutting chamber 1, a connection between the roller brush and the lower end cover 3 may be released.

Further, a plurality of blade assemblies 4 are provided at an inner wall of the cutting chamber 1. When the roller brush rotates relative to the cutting chamber 1, the plurality of blade assemblies 4 at the cutting chamber 1 may contact with the wrapped stuff on the roller brush, so that the wrapped stuff wound around the roller brush may be cut, to clean the to-be-cleaned object. In an embodiment, each blade assembly 4 may include a plurality of blades, which are disposed closely or spaced apart from each other.

In an embodiment, the cutting chamber 1 may be detachably connected to the base 300. When the wrapped stuff shredded by the blade assembly 4 needs to be removed from the cutting chamber 1, the user may detach the cutting chamber 1 from the base 300. Also, after the shredded wrapped stuff is removed, the cutting chamber 1 may be connected to the base 300 again for the next work.

The docking station of the disclosure may clean the wrapped stuff of a to-be-cleaned object, such as a roller brush of a robot cleaner, while charging the robot cleaner, to prevent the fingers from being scratched by the wrapped stuff. The cleaning system provides an auxiliary function for the docking station, extends the applicability of the docking station and is more convenient for home use.

Figure 2:
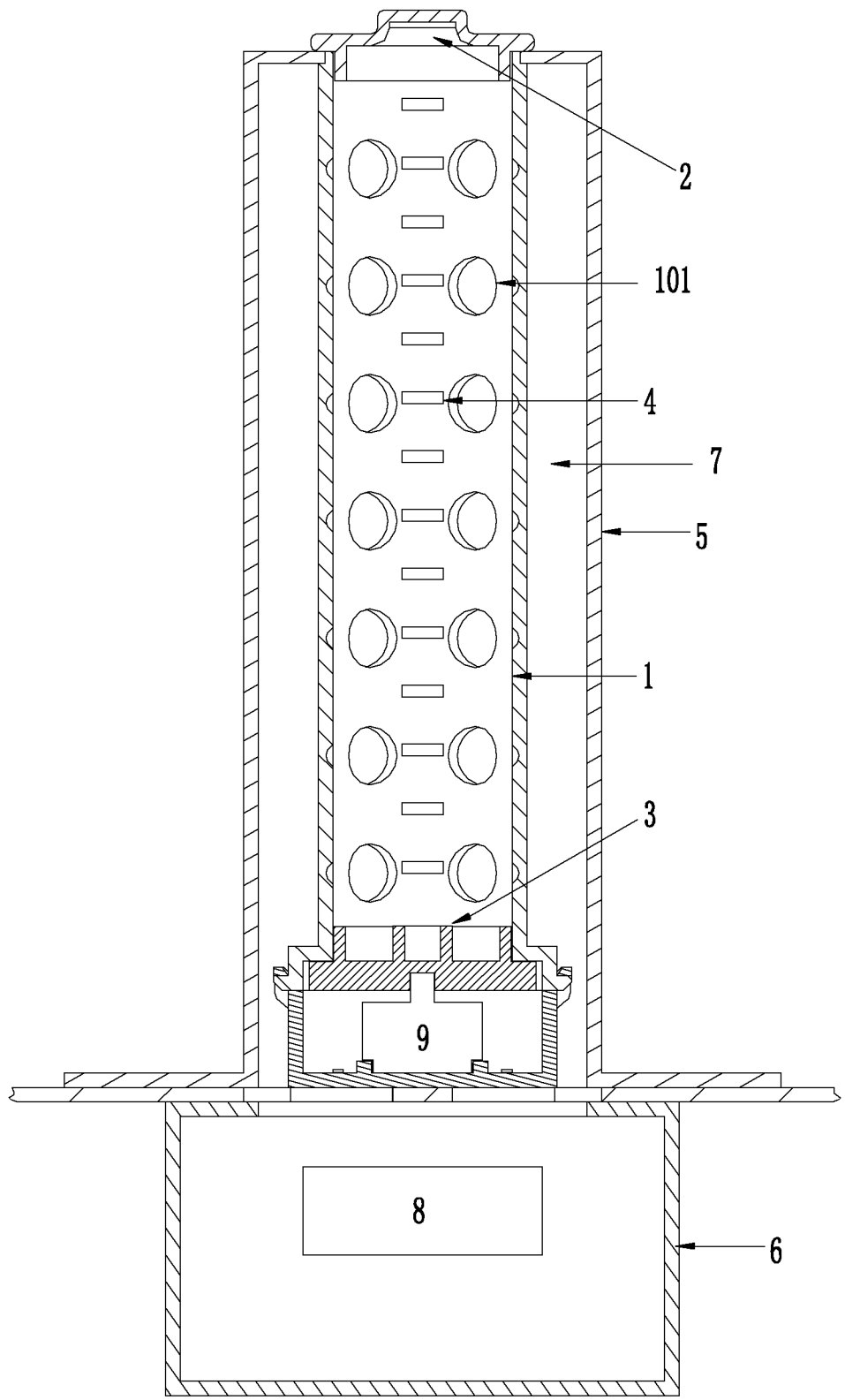
FIG. 2 is a schematic cross-sectional view of a cleaning system 200 according to another embodiment of the present disclosure.
Figure 3:
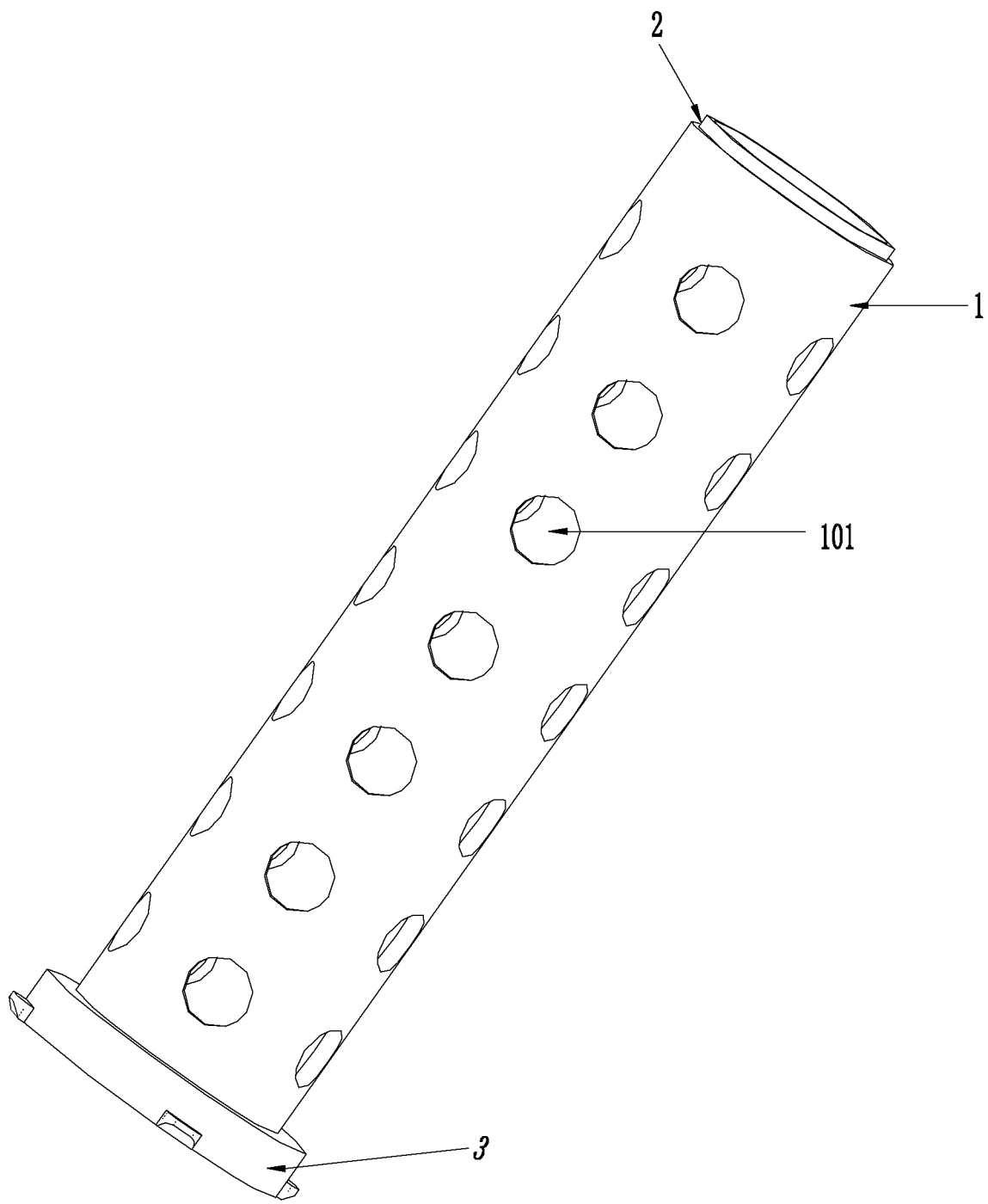
FIG. 3 is a schematic perspective view of a cutting chamber of the cleaning system 200 in FIG. 2.

Referring to FIGS. 2 and 3, in another embodiment, based on the cleaning system 100, the cleaning system 200 further includes an air pressure chamber 5 and a collecting chamber 6.

Additionally, the cutting chamber 1 may be disposed within the air pressure chamber 5, so that an air passage 7 is formed between the cutting chamber 1 and the air pressure chamber 5. Further, the cutting chamber 1 is provided with a plurality of through holes 101 to communicate an interior of the cutting chamber 1 with the air passage 7.

Further, the air passage 7 may communicate the air pressure chamber 5 with the collecting chamber 6. Moreover, an air blower may be provided in the collecting chamber 6. When the air blower is started, a negative pressure may be generated. Thus, the shredded wrapped stuff in the cutting chamber 1 may be sucked out through the through holes 101, and further may be drawn into the collecting chamber 6 through the air passage 7.

In an embodiment, the air pressure chamber 5 and the cutting chamber 1 may be fixedly disposed on the base 300, and the collecting chamber 6 may be detachably connected to the base 300. Thus, the collecting chamber 6 may be separately detached from the base 300 to remove the shredded wrapped stuff collected therein.

In one embodiment, a filtering member 8 is provided in the collecting chamber 6, and the filtering member 8 may be adjacent to the air pressure chamber 5. Thus, the filtering member 8 may filter other particles from the shredded wrapped stuff.

Referring to FIGS. 1 and 2, in an embodiment, the cleaning system 100 and the cleaning system 200 may also include a drive mechanism 9. The drive mechanism 9 may be connected to the lower end cover 3 to drive the lower end cover 3 to rotate relative with the cutting chamber 1. The drive mechanism 9 may also be connected with the cutting chamber 1 to drive the cutting chamber 1 to rotate relative with the lower end cover 3. During the lower end cover 3 rotating relative to the cutting chamber 1, the blade assembly 4 at the cutting chamber 1 may cut the wrapped stuff on the roller brush (on the lower end cover 3).

In an embodiment, a control system (not shown) is provided on the docking station. Additionally, the control system is connected to the drive mechanism 9, so that the drive mechanism 9 may be automatically activated or deactivated by the control system, or the user may manipulate the control system to activate or deactivate the drive mechanism 9.

Further, a timing unit (not shown) may be provided in the control system. When the control system activates the drive mechanism 9, the timing unit starts timing. Moreover, the timing unit may send a first signal to the control system in response to the timing unit counting up to a preset time, and the preset time may be a period of time preset by the user.

In an embodiment, the control system may receive the first signal and then the drive mechanism 9 may be deactivated based on the first signal. The control system may automatically deactivate the drive mechanism 9, to stop the blade assembly 4 from cutting the wrapped stuff.

In an embodiment, the first signal may also be an alarm signal used for warning the user, for example, beeping sound or musical sound. After recognizing the alarm signal, the user may deactivate the drive mechanism 9.

It should be noted that other configurations of the docking station may employ configurations known in the existing technology or known in the future. Herein, we will not set forth the details.

It should be noted that the "front", "back", "upper", "lower" and other orientations described herein are for convenience of description, and do not necessarily correspond to the front and rear of the space in actual work.

In the description of the present specification, the description referring to the terms "an embodiment", "some embodiments", "an example", "a specific example", or "some examples" and the like means that the particular features, structures, materials, or characteristics described in combination with the embodiment or example are included in at least one embodiment or example of present disclosure. Furthermore, the specific features, structures, materials, or characteristics described can be combined in any suitable manner in any one or more of the embodiments or examples.

What is claimed is:
1. A docking station, comprising:
a base; and
a cleaning system disposed in the base,
wherein the cleaning system comprises:
a cutting chamber, an upper end cover and a lower end cover;
the cutting chamber is configured to receive a to-be-cleaned object, and the upper end cover is detachably connected to an upper end of the cutting chamber;

the lower end cover is disposed at a lower end of the cutting chamber and is rotatably connected with the cutting chamber;

the to-be-cleaned object is detachably fixed to the lower end cover; and a blade assembly configured to clean the to-be-cleaned object is provided at an inner wall of the cutting chamber.

2. The docking station according to claim 1, wherein the cutting chamber is detachably connected to the base.

3. The docking station according to claim 1, wherein the cleaning system further comprises an air pressure chamber and a collecting chamber;

the cutting chamber is disposed within the air pressure chamber, and an air passage is formed between the cutting chamber and the air pressure chamber;

a plurality of through holes are provided on the cutting chamber, and the plurality of through holes communicates an interior of the cutting chamber with the air passage; and the air passage communicates the air pressure chamber with the collecting chamber.

4. The docking station according to claim 3, wherein the air pressure chamber and the cutting chamber are fixed on the base, and the collecting chamber is detachably connected to the base.

5. The docking station according to claim 4, wherein a filtering member is provided in the collecting chamber, and the filtering member is adjacent to the air pressure chamber.

6. The docking station according to claim 1, wherein the cleaning system further comprises a drive mechanism connected to the lower end cover and configured to drive the lower end cover to rotate relative with the cutting chamber.

7. The docking station according to claim 6, wherein a control system connected to the drive mechanism is provided on the docking station and configured to activate or deactivate the drive mechanism.

8. The docking station according to claim 7, wherein a timing device is provided in the control system; wherein the timing device is configured to start timing when the control system activates the drive mechanism; and the timing device is configured to send a first signal to the control system in response to the timing device counting up to a preset time.

9. The docking station according to claim 8, wherein the control system receives the first signal to deactivate the drive mechanism.

10. The docking station according to claim 1, wherein the cleaning system further comprises a drive mechanism connected to the cutting chamber and configured to drive the cutting chamber to rotate relative with the lower end cover.

* * * * *

UNITED STATES PATENT AND TRADEMARK OFFICE
CERTIFICATE OF CORRECTION

PATENT NO. : 11,191,408 B2  
APPLICATION NO. : 16/703813  
DATED : December 7, 2021  
INVENTOR(S) : Jisong Gao et al.

Page 1 of 1

It is certified that error appears in the above-identified patent and that said Letters Patent is hereby corrected as shown below:

On the Title Page

Item (72) Inventors, should read: Jisong Gao, Suzhou (CN); Xiaowei Xu, Suzhou (CN); Yuan Chen, Suzhou (CN); Xianmin Wei, Suzhou (CN)

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*